Patented Jan. 8, 1946

2,392,621

UNITED STATES PATENT OFFICE 2,392,621

METHOD OF PREPARING ESTERS

Franklin Strain, Barberton, Ohio, assignor to Pittsburgh Plate Glass Company, Pittsburgh, Pa., a corporation of Pennsylvania No Drawing. Application February 7, 1944, Serial No. 521,443

13 Claims. (Cl. 260—485)

This invention relates to new compositions of matter containing substantial proportions of an ester of a glycol and a half ester of a lower alkyl alcohol and an unsaturated dibasic acid and to methods of preparing them. The compositions are capable of polymerization to form new valuable synthetic resins as are hereinafter described.

In my application Serial 483,071, filed April 14, 1943, I have described glycol bis (alkyl fumarate) esters and methods of preparing them in pure state. I have now found that if the same esters are prepared by the reaction of glycol with dialkyl esters of unsaturated dicarboxylic acids there will be present substantial proportions of other esterification products which appear to have a desirable effect upon the chemical and physical properties of the polymers prepared from resulting ester mixtures. Accordingly, one of the objects of this invention is to provide superior polymerizable compositions and simple and economical methods of preparing the same.

The new method is useful in preparing ester mixtures in which the principal constituent is an ester having the structural formula:

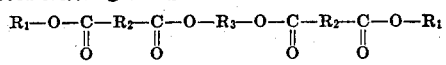

in which $R_1$ is a lower alkyl group such as methyl, ethyl, propyl, isopropyl, butyl, or other saturated aliphatic group, $R_2$ is a divalent aliphatic hydrocarbon radical having an olefinic bond attached to an alpha carbon atom as in the hydrocarbon nuclei of fumaric, maleic, itaconic, and citraconic acids, and $R_3$ is a divalent alkylene or alkylene ether such as in a glycol, for example, ethylene glycol, di-, tri-, or tetraethylene glycol, 1,2-propylene glycol, trimethylene glycol, 1,2-butylene glycol, tetramethylene glycol, di-, tri-, or tetrapropylene glycols and the corresponding polyglycols of the various dihydroxy butanes. In addition to the foregoing type of compound, the new compositions contain longer chained esters with more than two radicals of the unsaturated dicarboxylic acid in each molecule.

The new compositions are prepared by an alcoholysis reaction between more than two moles of the dialkyl ester of the unsaturated dicarboxylic acid and a single mole of the glycol. The dialkyl esters are prepared by any of the methods well known to the art, for example by direct esterification of the unsaturated dicarboxylic acid with a suitable alkyl alcohol such as methyl or ethyl alcohol. The dialkyl esters are reacted with the glycol by heating in the presence of an alcoholysis catalyst such as p-toluene sulphonic acid, trisodium phosphate, aluminum isopropylate or aluminum ethoxide at temperatures of 100–150° C. A polymerization inhibitor such as hydroquinone may also be present. The reaction vessel may be provided with a separate reflux condenser or a high vapor outlet which is air cooled. The vapor temperature should not greatly exceed the boiling point of the evolved alkyl alcohol at the pressure in the reaction vessel. A stream of carbon dioxide or other inert gas may be passed through the reaction vessel to sweep out the alkyl alcohol as evolved. The distillation of the alkyl alcohol may be promoted by conducting the reaction at a reduced pressure. The vapors from the reaction vessel are passed to a suitable condenser where the evolved alcohol is recovered and measured to estimate the progress of the reaction. When substantially one half of the alkyl alcohol of the dialkyl ester has been evolved the reaction will be complete.

In order to eliminate the excess unreacted dialkyl ester the reaction mixture is heated further, preferably at reduced pressures and in the presence of a polymerization inhibitor. The dialkyl ester is thereby vaporized and removed either entirely or in part to form a clear non-viscous liquid. Since the dialkyl esters of dicarboxylic olefinic acids are polymerizable the properties of the polymers are not seriously impaired by its presence. More desirable resins are formed by the polymerization of compositions from which at least part of the dialkyl ester excess has been removed since such compositions have a higher proportion of the glycol bis (alkyl fumarate) type esters. Slight amounts of color sometimes present may be eliminated by heating with activated charcoal or by washing with dilute sodium hydroxide and/or water. Generally, it is desirable to wash with dilute sodium hydroxide, dilute hydrochloric acid and/or water to remove the polymerization inhibitors.

Theoretically the glycol bis (alkyl fumarate) type ester corresponds to a 2:1 ratio of dialkyl ester to glycol. If this ratio of reactants is used a viscous composition not well suited to use as a casting or impregnating liquid is obtained. Accordingly, an excess of the dialkyl ester must be used in the practice of this invention if a satisfactory liquid composition is to be prepared. When less than a 2:1 ratio is used the resulting compositions are very viscous liquids or solids due to the high proportions of alkyd type molecules. Since the new compositions are intended for use in cast polymerization operations or in liquid impregnation work it is desirable to avoid the formation of large proportions of alkyd resins. Molar ratios of reactants slightly greater than 2:1 must be used and ratios as great as 10:1 may be used.

A series of four preparations were made in accordance with this invention, using molar ratios of diethyl fumarate to diethylene glycol of 4:1, 3:1, 2:1, and 1.5:1. A sample of pure diethylene glycol bis (ethyl fumarate) was also prepared in accordance with the method described in my application Serial No. 483,071. The results are tabulated below.

|   | Mole ratio diethyl fumarate to glycol |   | Barcol hardness of polymer |
|---|---|---|---|
| (1) | 4 | Liquid | 26 |
| (2) | 3 | do | 25 |
| (3) | 2 | Viscous |  |
| (4) | 1.5 | Very viscous | 32 |
| (5) | (Pure compound) | Thin liquid | 6 |

This shows that excess dialkyl ester is required for the formation of the most useful ester compositions in accordance with the practice of this invention.

The above tabulation also indicates that harder polymers are obtained by the polymerization of ester mixtures than are obtained by the identical polymerization of the pure diethylene glycol bis (ethyl fumarate). The polymerization was conducted in the presence of 0.5 percent benzoyl peroxide at 70° C. for 72 hours. The hardness was measured by a standard indentation method (Industrial Engineering Chemistry, News edition, March 25, 1941, page 384).

The liquid ester mixtures containing glycol bis (fumarate) esters as their principal constituent will polymerize upon heating preferably at temperatures above 40° C. in the presence of organic percarbonates to form hard transparent solids. When benzoyl peroxide or other organic peroxides are used as polymerization catalysts temperatures in excess of 60° C. are usually required to induce polymerization. The rate and extent of polymerization will also depend to some extent on the proportion of catalyst present. Catalysts in quantities ranging from 0.01 percent to 1 percent have been used with successful results. Generally, about 0.5 percent will be sufficient to induce polymerization to the maximum extent. Less brittle and stronger polymers may be obtained by using somewhat less than this amount of polymerization catalyst.

The new polymerizable compositions may be used to prepare transparent articles by a casting procedure. They may also be used as impregnating agents or adhesives in the preparation of laminated cloth articles or in other heterogeneous reenforced fibrous compositions. Valuable coating compositions may also be prepared from the new polymerizable materials.

Further details of the preparation and use of the new compositions are set forth in the following detailed examples:

Example I

A slight excess over two moles of diethyl fumarate (320 g.) and one mole of diethylene glycol (106 g.) were heated with 8 g. of p-toluenesulphonic acid and 5 g. of hydroquinone in a Claisen flask. The reaction temperature was maintained by heating on an oil bath so as to maintain a temperature of 30 to 40° C. at the vapor outlet. A small stream of carbon dioxide was passed through the reaction mixture at the rate of about one bubble per second to sweep out the alcohol evolved during reaction. The gas stream was passed successively through a water condenser and a trap cooled with a mixture of acetone and Dry Ice. Most of the alcohol was condensed in the trap, but some was recovered in the water condenser. After two hours, 96 percent of the theoretical alcohol had been recovered and the reaction was apparently complete. The temperature of the oil bath was then gradually raised to 150° C. and the pressure reduced to 3 to 5 mm. and maintained for one half hour to remove unreacted diethyl fumarate and diethylene glycol. The slightly viscous liquid residue was washed with 2 percent hydrochloric acid, twice with 2 percent $K_2CO_3$ solution, and finally twice with water.

A clear resin sheet was prepared by mixing the liquid ester composition with 0.5 percent benzoyl peroxide and casting it between sheets of tempered plate glass provided with a soft elastic synthetic rubber edge retaining gasket. The mold was maintained at 70° C. for two hours, then heated for twelve hours at a temperature gradually increasing to 115° C. which was then maintained for two hours. A hard strong polymer of a nearly colorless transparent resin was obtained.

Example II

A mixture of dimethyl fumarate (122 g.) and ethylene glycol (15 g.), being a 4:1 mole ratio, was refluxed on a 120° C. oil bath for eight hours at 30 mm. The reactants were refluxed while the methyl alcohol evolved passed through the water condenser and was recovered in a Dry Ice trap. When the reaction was complete, 92 percent of the theoretical amount of alcohol had been recovered. Two grams of hydroquinone were added to inhibit polymerization and the crude product was topped by heating to 140° C. at 2 to 3 mm. for one half hour. The resulting composition was a slightly colored, nonviscous liquid. It was washed twice with 2 percent hydrochloric acid solution and five times with water and finally dried over anhydrous sodium sulphate. A colorless liquid composition was thereby obtained.

A ten gram sample of the composition was mixed with 0.5 percent of isopropyl percarbonate and heated for three hours at 50° C. A tough gel was obtained which upon heating 5 hours longer became a hard, transparent, glass-like solid.

Example III

A mixture of 106 g. of diethylene glycol and 3 molar equivalents of methyl fumarate (366 g.), 10 g. of trisodium phosphate and 5 g. of pyrogallol were placed in a 1000 cc. Claisen flask. The mixture was heated for two hours on an oil bath which was maintained at a temperature between 100–130° C. At the end of 2½ hours of heating 88 percent of the theoretical quantity of methyl alcohol was evolved. Further heating caused a rapid elevation in the temperature of the exit vapors. The heating was continued at gradually reduced pressures until the gas temperature at the flask outlet reached 150° C. and the pressure 5 mm. These conditions were maintained for one half hour to evolve the excess dimethyl fumarate. The liquid residue was washed successively with 2 percent hydrochloric acid, 2 percent sodium carbonate, and 5 times with water. A clear fluid composition was thereby obtained.

Upon polymerization for 5 hours at 70° C. in the presence of 0.2 percent of benzoyl peroxide a hard colorless transparent resinous material was formed.

*Example IV*

Using the procedure described in Example II, one mole of ethylene glycol was reacted with 4 moles of diethyl fumarate. After topping to remove the excess reactants and washing with dilute sodium hydroxide solution, hydrochloric solution, and water, a non-viscous colorless composition was obtained.

A portion of this composition was mixed with one percent isopropyl percarbonate and heated at 50° C. for eight hours. A nearly colorless glass-like solid resin was obtained.

*Example V*

Using the procedure described in Example III one mole of 1,2-propylene glycol was reacted with 3 moles of diethyl maleate. A clear colorless ester composition was obtained which polymerized readily in the presence of 0.1 percent of benzoyl peroxide.

*Example VI*

Using the procedure described in Example II one mole of diethylene glycol was reacted with 4 moles of diethyl itaconate. After topping and washing as described a colorless composition resulted. Upon polymerization in the presence of 0.5 percent of ethyl percarbonate at 60° C. a hard nearly colorless solid resin was formed.

Throughout the specification and claims the term "a glycol" is used in the generic sense and includes the various alkylene glycols as well as the alkylene ethers or polyglycols.

Although the invention is described by certain specific examples, the details of same shall not be construed as limitation on the scope of the invention except to the extent incorporated in the following claims.

I claim:

1. A method of preparing a liquid composition which is polymerizable to form a synthetic resin and the principal constituent of which consists of a monomeric glycol bis ester of a lower alkyl half ester of an alpha-beta unsaturated aliphatic alpha-beta dicarboxylic acid, which method comprises heating a mixture of a dialkyl ester of said acid in which the alkyl groups correspond to the alkyl groups of the half ester to be prepared and each contain 1 to 4 carbon atoms, a glycol, the dialkyl ester being present in a molar ratio of 2 to 1 with respect to the glycol and an alcoholysis catalyst, thereby splitting off one of the alkyl groups from the dialkyl ester and forming said glycol bis ester, continuously removing the alkyl alcohol thus produced continuing the heating operation until substantially all of the glycol has been completely esterified and removing the unreacted dialkyl ester remaining by distillation.

2. A method of preparing a liquid composition which is polymerizable to form a synthetic resin and the principal constituent of which consists of a monomeric glycol bis ester of a lower half ester of an alpha-beta unsaturated alpha-beta dicarboxylic acid, which method comprises heating a mixture of a dialkylene ester of said acid in which the alkyl groups correspond to the alkyl groups of the half ester to be prepared and each contains 1 to 4 carbon atoms, a glycol, and a polymerization inhibitor, the molar ratio of the dialkyl ester being 2 to 1 with respect to the glycol, continuously removing the alkyl alcohol produced by the resultant reaction, continuing the heating operation until substantially all of the glycol has been completely esterified and removing the unreacted dialkyl ester remaining by distillation.

3. A method of preparing a liquid coating composition as defined in claim 1 in which the glycol is an alkylene ether glycol.

4. A method as defined in claim 1 in which the glycol is alkylene.

5. A liquid composition which is polymerizable to form a synthetic resin and the principal constituent of which consists of a monomeric glycol bis ester of a lower alkyl half ester of an alpha-beta unsaturated alpha-beta dicarboxylic acid, the alkyl groups of which contain 1 to 4 carbon atoms, which product is formed by heating a mixture of a dialkyl ester of said acid in which the alkyl groups each contain 1 to 4 carbon atoms and an alcoholysis catalyst, the dialkyl ester being present in a molar ratio of 2 to 1 with respect to the glycol, continuously removing the alkyl alcohol produced by the resultant reaction, continuing the heating operation until substantially all of the glycol has been completely esterified and removing the unreacted dialkyl ester remaining by distillation.

6. A method of preparing a polymerizable liquid composition which comprises heating a glycol with a lower dialkyl ester of an aliphatic dicarboxylic acid having an olefinic bond attached to an alpha carbon atom, the molar ratio of dialkyl ester to the glycol being in excess of 2:1, said heating being done in the presence of an alcoholysis catalyst, continuously removing the alkyl alcohol thereby formed, continuing said heating until substantially all of the glycol has been completely esterified, and removing unreacted dialkyl ester by vacuum distillation in the presence of a polymerization inhibitor.

7. The method of claim 1 in which the glycol is diethylene glycol.

8. The method of claim 1 in which the diester is diethyl fumarate.

9. The method of claim 1 in which the glycol is diethylene glycol and the diester is diethyl fumarate.

10. The composition defined by claim 5 in which the glycol is diethylene glycol.

11. The composition defined by claim 5 in which the diester is diethyl fumarate.

12. A composition of matter prepared by the reaction of diethyl fumarate and diethylene glycol in molar proportions of 2:1 respectively and removing at least part of the diethyl fumarate.

13. A polymerizable composition prepared by reacting diethyl fumarate and diethylene glycol in the presence of an alcoholysis catalyst, said diethyl fumarate and diethylene glycol being present in the molar ratio of 2:1, and removing at least part of the unreacted diethyl fumarate by distillation in the presence of a polymerization inhibitor.

FRANKLIN STRAIN.